UNITED STATES PATENT OFFICE.

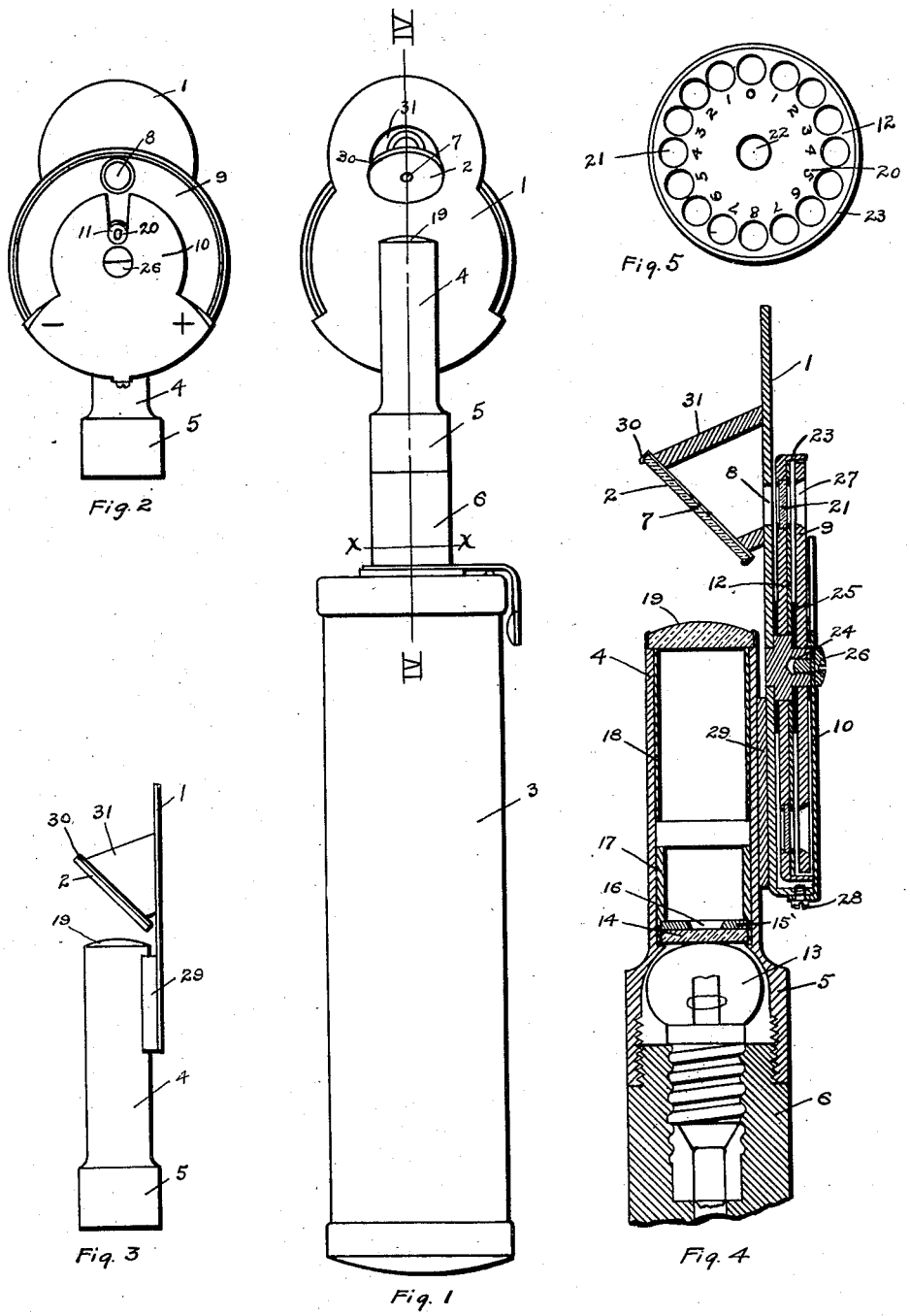

HENRY L. DE ZENG, OF MOORESTOWN, NEW JERSEY.

OPTICAL INSTRUMENT.

1,423,092.  Specification of Letters Patent.  Patented July 18, 1922.

Application filed April 16, 1921. Serial No. 461,794.

*To all whom it may concern:*

Be it known that I, HENRY L. DE ZENG, a citizen of the United States, residing at Moorestown, in the county of Burlington and State of New Jersey, have invented certain new and useful Improvements in Optical Instruments, of which the following is a specification.

This invention relates to improvements in optical instruments such as ophthalmoscopes, retinoscopes, etc., and has particular reference to means for providing superior illumination in such instruments.

The principal object of the invention is to provide means for securing superior illumination by using a light source of increased illuminating power as compared with those heretofore used in instruments of this character.

Other objects of the invention are to provide means for using a larger and more powerful light source applied in a novel and practical manner; providing means for diffusing and restricting the light in its application; providing an instrument with increased illumination whereby the examination of the eye is greatly facilitated; providing a construction for a larger and more powerful illumination wherein the present and acceptable form of such instruments is not materially altered; the provision of means whereby the use of ordinary and inexpensive miniature lamps of commerce are utilized, thus materially decreasing the cost of maintenance of the instrument; the provision of an instrument more universal in its application than instruments heretofore used; the provision of an instrument that will always be in operable condition; to provide a uniform intensity of illumination of the object under examination; to provide means for diffusing the light whereby the illumination is rendered uniform throughout the visible field, eliminating the high lights and shadows of present instruments; and the provision of means for controlling the light whereby a spot of light properly adapted to use in diagnosis is obtained.

Further objects and advantages of my improved instrument include the simplification of parts and the various structural features and details by which the foregoing advantageous results may be accomplished in a practicable manner, and should be apparent from the following specification taken in connection with the accompanying drawings, in both of which the preferred forms of the invention are described by way of illustration only, but it will be understood that I may make any modifications in the specific details of construction shown and described within the scope of the appended claims without departing from or exceeding the spirit of the invention.

Figure 1 is an elevation of an ophthalmoscope containing the invention, showing the front side.

Figure 2 is an elevation of the top portion of Figure 1 showing the rear side.

Figure 3 is an elevation of the top portion of a retinoscope containing the invention, showing a side view.

Figure 4 is a vertical cross section on line IV—IV of Figure 1 down to the line X—X.

Figure 5 is a plan view of the lens disk shown in section in Figure 4.

All ophthalmological instruments thus far produced have been of such construction that the miniature lamps used therein were of low illuminating power and the usefulness of the instruments were correspondingly limited. The present invention is designed to permit the use of larger and more powerful lamps, thus greatly increasing the value of the instrument and at the same time expediting the examination of the eye.

Ophthalmological instruments have heretofore employed miniature electric lamps designed and made especially for each type of instrument of different manufacture. Such special lamps are necessarily expensive and difficult to procure. The prices range approximately from seventy-five cents to a dollar and a half. This invention permits the use of stock miniature lamps carried by all flashlight supply stores, the prices ranging from ten to twenty-five cents each. The utilization of stock lamps makes the instrument far more universal in its application than instruments of present construction, it being obvious that the practical use of an ophthalmological instrument is greatly limited if lamps of special manufacture only can be used. My improved instrument need never be out of use through want of lamps, as is frequently the case with present instruments, due either to forgetfulness to order lamps, or to damage or loss in transit, or inaccessible source of supply, for all flashlight supply stores throughout the civilized world carry lamps suitable for use in my improved instrument.

Ophthalmological instruments as at present constructed show marked inequality of illumination in the various parts of the illuminated area and such inequalities interfere seriously with the attainment of a complete and reliable diagnosis. In my instrument through the use of a light diffuser the illumination is rendered of a uniform intensity throughout the visible field, the high lights and shadows of present instruments being eliminated.

The light diffuser, in its preferred form, consists of a piece of ground glass. Grinding or otherwise treating one surface to render it translucent, I find to be usually acceptable, but grinding on both sides, or otherwise superimposing two ground surfaces, gives further improvement in results. The light diffuser is preferably adjustably mounted in order that it may closely approximate the light source and thereby diffuse a maximum amount of light.

In the construction of present instruments a small tube is used for the light passageway and the lamp is contained therein. Since such a construction obviously requires that the lamp be smaller than the passageway, the specially made miniature lamps of small caliber and correspondingly low illuminating power are necessary. In my instrument the lamp is not restricted to the small light passageway, hence larger lamps of standard stock type may be utilized.

In the preferred form of my invention I use a larger lamp placed beyond the periphery of the lens carriers and more particularly beyond the body plate of the instrument. With the lamp located in such position its housing may be much larger than the light passageway without causing the longitudinal axis of the light passageway to be moved away from the lens carriers and more particularly away from the body portion of the instrument. Such a construction therefore avoids the necessity of an increase in the thickness of the instrument or other material change in the customary and approved design.

The light restrictor used in my improved instrument consists, in its preferred form, of a flat metal plate or diaphragm having a circular central opening of desired size by which the preferred amount of light may be transmitted to the reflector. While the light diffuser is of the greatest value in obtaining uniform illumination, the light restrictor cuts off the peripheral zone and restricts the passage of light to the highly illuminated central area. By this construction an intensely brilliant central field of comparatively small area is obtained and this is of especial value in its application to the retinoscope.

Referring to the drawings: The instrument in general comprises a supporting and attaching body plate 1, a reflecting mirror 2 and an illuminating handle portion 3, and in the case of an ophthalmoscope a series of lenses rotatably mounted in the lens carriers 9 and 12. The light from the illuminating handle impinges on the mirror and is reflected into the eye of the patient. The body plate, the mirror and the lens carriers have aligned sight openings through which the observer may look into the illuminated eye.

The foundation of the instrument is the body or base plate 1 having a sight opening 8. Attached to the body plate 1 is the reflector block 31 which carries an inclined reflector mirror 2 having a sight opening 7, the sight opening 7 being in alinement with the sight opening 8 in the base plate 1. The mirror has a backing 30 indicated in Figure 4.

In the case of the ophthalmoscope a series of lenses are rotatably mounted on the observer's side of the body plate 1 having the sight opening 27 in alinement with the sight opening 8 in the body plate 1. The lens carriers 9 and 12 are pivoted about the center 22 on the stud 24 attached to the body plate 1. The lens carrier 12 contains the lenses 21 as indicated in Figure 5, the powers of which are indicated on the lens carrier by 20. These figures indicating the lens powers are read through the opening 11, see Figure 2, when the instrument is in use. 23 is a knurled flange for rotating the disk 12. There is a spacing washer 25 between the disks. The disks are held in place by a retaining screw 26, Figure 4. The lenses in the disk 9 are auxiliary lenses concealed under the top plate 10, which is held in place on the base plate 1 by the screw 28. The various lenses are capable of rotation by the fingers in alinement with the sight opening 8 in the body plate 1, the disk 12 carrying the main lenses and the disk 9 the auxiliary lenses to be used in relation with the primary lenses in the disk 12. The method of operation is the same as in present ophthalmoscopes of approved design. The arrangement of the retinoscope shown in Figure 3 is identical with that of the ophthalmoscope except that the rotating lens attachment is omitted, and the light passageway is preferably longer. A condensing lens of greater focal length may then be employed. Whereas the present retinoscopes employ condensing lenses of approximately 1″ focal length, in my improved instrument, I prefer to use a condensing lens of increased focal length, thereby obtaining a more homogeneous projection through the elimination of the spherical disturbances present in condensers of shorter focal length. The accuracy of the retinoscope depends primarily upon the character of this projected illumination.

The illuminating system which consists of a light source chamber 5 and a light tube or passageway 4, is secured to the body plate 1 by the plate 29, Figure 4. The arrangement of the light chamber and light passageway is the important and novel feature of this invention. It will be noted that the lamp housing 5 surrounding the source of light chamber is considerably larger than the light passageway in the tube 4. The housing 5 of the lamp chamber is secured to the lamp carrier or handle 6 by screw threads on the inside of the lamp housing 5, as indicated in Figure 4. Between the lamp chamber and the light passageway, preferably at the lower end of the light passageway, is a light restricting plate 15 having an opening 16 by which the amount of light passing from the lamp chamber to the light passageway is controlled. Also between the lamp chamber and the light passageway is a light diffuser 14, which consists preferably of a piece of glass rendered translucent on one or both sides by grinding or other suitable treatment. The object of this diffuser is to diffuse the light whereby the illumination is rendered uniform throughout the visible field, and the high lights and shadows usually found in instruments of this kind, eliminated.

It will be noted that there is considerable difference in size between the lamp chamber and the light passageway, the lamp chamber being much larger than the light passageway, and is located approximately at the periphery of the body portion and in the case of the ophthalmoscope approximately at the periphery of the lens dials. The light diffuser 14 and the light restricter 15 are held in the mounting 17, while 18 is an inner casing which prevents the mounting 17 from moving more than a given distance away from the lamp.

The lamp 13 is the ordinary stock miniature flashlight lamp of commerce and takes the place of the specially manufactured lamps for the inner side of light tubes used in present instruments. The battery for the lamp is as usual carried in the handle 3. In operation the light from the lamp 13 is diffused by the plate 14 and passes through the opening 16 in the restricter 15 along the light tube or passageway 4 through the condenser lens 19 onto the reflector 2 and is reflected into the eye of the patient, which eye is observed by the observer through the sight openings 27, 8 and 7, respectively.

By increasing the size of the lamp or illuminating chamber, lamps of much higher power and endurance may be employed and by using a restricted light tube a highly condensed illumination may be used giving a much higher illumination than previously obtained, which illumination may be equalized by the diffuser and controlled by the restricter 15. The position of the diffuser and restricter are regulated by the distance tube 18 and by the mounting 17 which can be slipped back and forth in the light tube to desired position.

It will be evident that my invention provides an electrically lighted ophthalmologic instrument having four important advantages; first, increased illumination; second, uniform illumination; third, universal application due to its utilization of stock lamps; and fourth, lower cost of maintenance.

I claim:

1. In a hand supported ophthalmologic instrument, a handle grip having a light chamber, a source of light in the light chamber, a reduced channel section beyond the handle grip, a diaphragm cross plate in the channel portion having an orifice smaller than the cross section of the channel, a supporting plate having a sighting orifice secured to the outside of the reduced channel portion and extending substantially parallel with and beyond the end thereof, and an inclined mirror having an orifice secured to the supporting plate in alinement with the channel portion.

2. In a hand supported ophthalmologic instrument, a hollow handle grip having a light chamber and a battery cavity therein, an electric bulb in the light chamber, an electric battery in the battery cavity, an electric contact between the bulb and battery, a reduced channel portion beyond the light chamber, threaded means for uniting the handle grip and the reduced channel, a cross plate in the channel having an orifice, a light diffusing cross member in the channel, a supporting plate having a sighting orifice secured to the outside of the reduced channel and extending substantially parallel with and beyond the end thereof, and an inclined mirror having an orifice secured to the supporting plate beyond the end of the channel and in alinement with the handle and reduced channel.

3. In a hand supported ophthalmologic instrument, a handle having an internally and externally threaded nipple, a lamp carried in threaded engagement with the internal threads, a flared section having threaded engagement with the external threads, a reduced channel section beyond the flared section, a supporting plate having a sight opening secured to the outside of the reduced channel and extending substantially parallel therewith, an inclined mirror having an opening secured to the supporting plate beyond the end of the channel and in alinement with the channel portion, a cross plate having an orifice in the channel, a cross light diffusing member in the channel and a condenser lens in the channel.

4. In a hand supported ophthalmologic instrument, a handle having an internally and externally threaded nipple, a lamp carried in threaded engagement with the internal threads, a flared section having threaded engagement with the external threads, a reduced channel portion beyond the flared section, a supporting plate having a sight opening secured to the outside of the reduced channel and extending substantially parallel therewith, and an inclined mirror having an opening secured to the supporting plate beyond the end of the channel and in alinement with the channel.

5. In a hand supported ophthalmologic instrument, a handle having an internally and externally threaded nipple, a lamp carried in threaded engagement with the internal threads, a flared section having threaded engagement with the external threads, a reduced channel portion beyond the flared section, a supporting plate having a sight opening secured to the outside of the reduced channel and extending substantially parallel therewith, an inclined mirror having an opening secured to the supporting plate beyond the end of the channel and in alinement with the channel, and a series of lenses rotatably mounted on the supporting plate and adapted to be successively rotated before the sight opening in the supporting plate.

6. In a hand supported ophthalmologic instrument, a handle grip having a light chamber, a source of light in the light chamber, a reduced channel section beyond the handle grip, a diaphragm cross plate in the channel portion having an orifice smaller than the cross section of the channel, a supporting plate having a sighting orifice secured to the outside of the reduced channel portion, and an inclined mirror having an orifice secured to the supporting plate in alinement with the channel portion.

In testimony whereof I have affixed my signature, in presence of two witnesses.

HENRY L. DE ZENG.

Witnesses:
EMILIE S. GREENWALD,
C. H. KERR.